(12) United States Patent
Nicol

(10) Patent No.: US 10,569,823 B2
(45) Date of Patent: Feb. 25, 2020

(54) STEM FOR A TWO-WHEELED VEHICLE

(71) Applicant: Morgan Nicol, Collina d'Oro (CH)

(72) Inventor: Morgan Nicol, Collina d'Oro (CH)

( * ) Notice: Subject to any disclaimer, the term of this patent is extended or adjusted under 35 U.S.C. 154(b) by 0 days.

(21) Appl. No.: 16/090,542

(22) PCT Filed: Mar. 30, 2017

(86) PCT No.: PCT/EP2017/057498
§ 371 (c)(1),
(2) Date: Oct. 1, 2018

(87) PCT Pub. No.: WO2017/167855
PCT Pub. Date: Oct. 5, 2017

(65) Prior Publication Data
US 2019/0111992 A1  Apr. 18, 2019

(30) Foreign Application Priority Data

Mar. 30, 2016  (DE) .................. 10 2016 105 823

(51) Int. Cl.
B62K 21/16  (2006.01)
B62K 21/12  (2006.01)
(Continued)

(52) U.S. Cl.
CPC ............. B62K 21/16 (2013.01); B62K 21/12 (2013.01); B62K 21/18 (2013.01); B62K 21/22 (2013.01)

(58) Field of Classification Search
CPC ...... B62K 21/00; B62K 21/12; B62K 21/125; B62K 21/16; B62K 21/18; B62K 21/22
(Continued)

(56) References Cited

U.S. PATENT DOCUMENTS 5,404,769 A  4/1995 Kao
8,661,935 B2 *  3/2014 Cote .................. B62K 21/125
74/551.3
(Continued)

FOREIGN PATENT DOCUMENTS

DE  102009013022 A1  9/2010

OTHER PUBLICATIONS

German Search Report from German Patent Application No. 10 2016 105 823.8, dated Jan. 10, 2017.
(Continued)

Primary Examiner — Prasad V Gokhale
(74) Attorney, Agent, or Firm — Greer, Burns & Crain, Ltd.

(57) ABSTRACT

A stem for a two-wheeled vehicle, including a first end and a second end, wherein the first end is provided with a mounting section which is suitable and configured to be fastened to at least one fork column. Furthermore, a holding device for a handlebar device is disposed between the first end and the second end. A stem length is provided between the mounting section and the holding device for the handlebar device. Moreover, an adjustment section with an adjustment member is provided between the first end and the second end wherein the holding device for the handlebar device is provided in portions by the adjustment member. Depending on the arrangement of the adjustment member in the adjustment section, two different stem lengths can thus be set.

12 Claims, 4 Drawing Sheets

(51) Int. Cl.
*B62K 21/22* (2006.01)
*B62K 21/18* (2006.01)

(58) Field of Classification Search
USPC .............................................. 74/551.1, 551.3
See application file for complete search history.

(56) References Cited

U.S. PATENT DOCUMENTS

| | | | | |
|---|---|---|---|---|
| 2010/0275723 | A1* | 11/2010 | Servet | B62K 21/16 |
| | | | | 74/551.1 |
| 2012/0297922 | A1* | 11/2012 | Cote | B62K 21/125 |
| | | | | 74/551.3 |
| 2014/0049023 | A1* | 2/2014 | Pryde | B62K 21/16 |
| | | | | 280/279 |
| 2018/0334217 | A1* | 11/2018 | Li | B62K 21/22 |

OTHER PUBLICATIONS

International Search Report from International Patent Application No. PCT/EP2017/057498, dated Jul. 27, 2017.

* cited by examiner

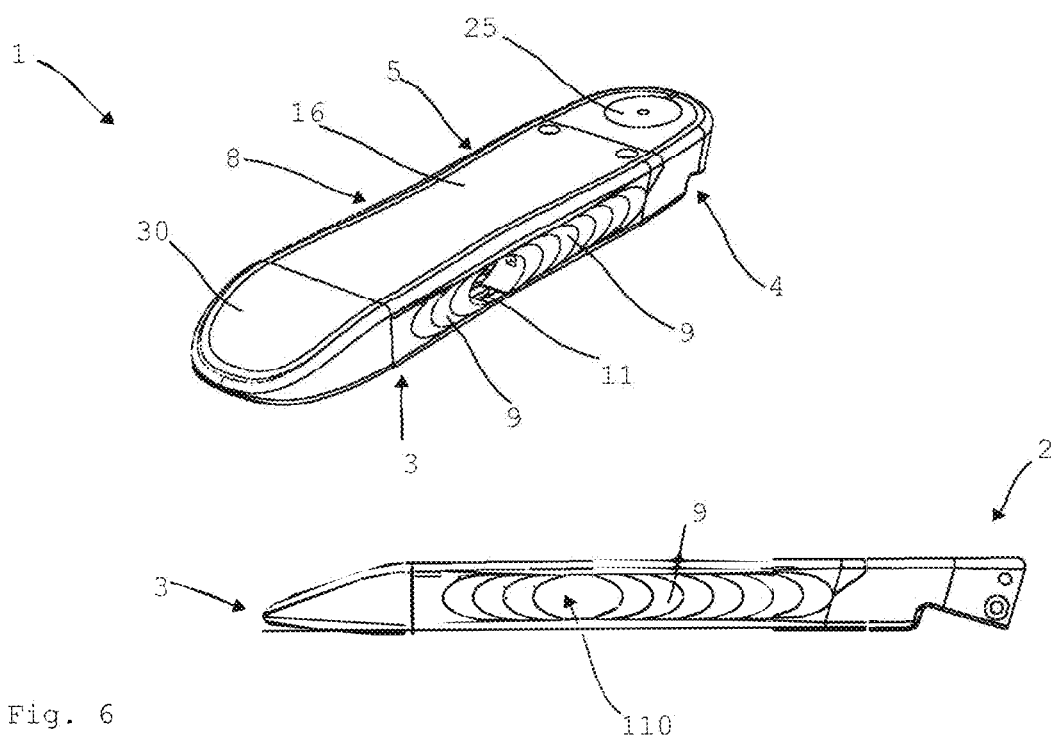
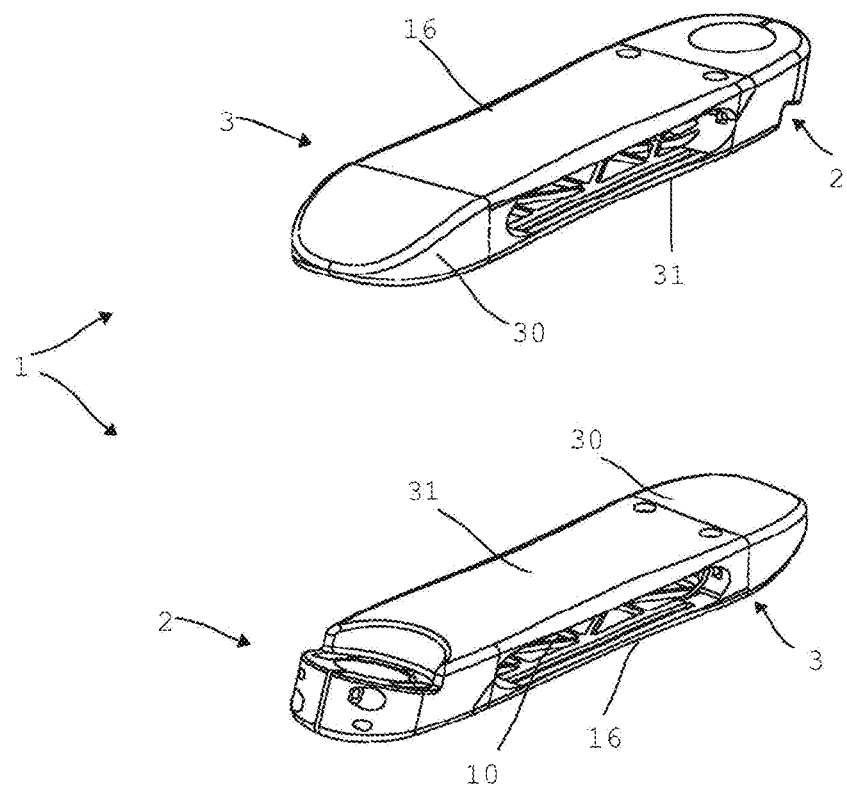
Fig. 6
Fig. 7

STEM FOR A TWO-WHEELED VEHICLE

BACKGROUND

The present invention relates to a stem which can be employed in particular in at least partially muscle-powered two-wheeled vehicles such as bicycles. The stem comprises at least one first end and at least one second end wherein the first end is provided with at least one mounting section which is suitable and configured to be fastened to at least one fork column. Furthermore, at least one holding device for at least one handlebar device is disposed between the first and second ends. A specific stem length is set between the mounting section and the holding device for the handlebar device.

In the case of two-wheeled vehicles, in particular at least partially muscle-powered two-wheeled vehicles such as bicycles, the connection between the fork column and the handlebar is as a rule provided by a so-called stem.

The distance of the handlebar to the cyclist is adjusted by way of the length of the stem, the so-called stem length, and the inclination of the stem at the fork column. Thus, a cyclist can adjust an optimal riding position by way of selecting a stem having a suitable length and/or by way of setting the inclination. The shape of the handlebar used is also pertinent.

Specifically in the case of racing bicycles it is important to adjust an optimal riding position by way of arranging the handlebar precisely. A cyclist must install a suitable stem to obtain a suitable riding position.

A cyclist wishing to change the riding position must replace the old stem by a new stem showing adapted dimensions corresponding to the desired riding position. This is relatively complicated and expensive. Furthermore the cyclist may have to exchange the stem a number of times until a comfortable riding position is set.

It is therefore the object of the present invention to provide the rider of a two-wheeled vehicle with more flexible adjustment options for an optimal riding position.

SUMMARY

The stem according to the invention is in particular suited to be used for an at least partially muscle-powered two-wheeled vehicle. The stem comprises at least one first end and at least one second end wherein the first end is provided with at least one mounting section which is suitable and configured to be fastened to at least one fork column. Furthermore at least one holding device for at least one handlebar device is disposed between the first end and the second end wherein a stem length is set between the mounting section and the holding device for the handlebar device. Moreover at least one adjustment section having at least one adjustment member is provided between the first end and the second end wherein the holding device for the handlebar device is provided by means of the adjustment member at least in portions. Depending on the arrangement of the adjustment member in the adjustment section at least two different stem lengths can be set.

The stem according to the invention may in particular be employed in at least partially and/or entirely muscle-powered two-wheeled vehicles such as bicycles or e-bikes. The invention is, however, not solely limited to two-wheeled vehicles but to any desired vehicle having a handlebar for steering such as a bicycle has.

A stem according to the invention and also in general is the connection between the fork column and a handlebar wherein the stem length has a not insignificant influence on the riding position of the cyclist. The riding position in turn greatly influences the sitting comfort, the economy of riding and the aerodynamics of the cyclist on the bicycle.

Thus, it depends among other things on the stem length and the inclination of the stem how erect a cyclist can sit on the two-wheeled vehicle which in turn is also dependent on the type and shape of the employed handlebar respectively handlebar device.

According to the invention the stem length is defined as the distance between the centre of the attachment of the stem to the fork column and the centre of the attachment respectively the holding device of the handlebar respectively a handlebar device.

The first end of the stem according to the invention is preferably configured such that it can be attached to respectively accommodated on a fork column by way of the mounting section. The mounting section can preferably be directly or else indirectly attached to and/or accommodated on the fork column. It is thus irrelevant to the architecture of the stem according to the invention whether the stem is placed directly on and for example screwed to the fork column, or whether a stem shaft is provided which is inserted into the fork column.

The stem according to the invention offers many advantages. A considerable advantage is that the stem according to the invention provides particular flexibility of setting different stem lengths. Consequently the stem according to the invention can be used by different cyclists wherein the stem can then be optimally set and adjusted to the desired stem length. Thus, a "one size fits all" stem can be used for cyclists of various sizes or for different riding positions. Even if the handlebar is exchanged the stem length can be optimally set using the same stem.

Preferably the adjustment section comprises at least one slot device which is in particular disposed transverse to the longitudinal extension of the stem. The longitudinal extension of the stem is the extension of the stem between the first and second ends. The slot device is in particular configured as a slot, duct, and/or passage respectively through hole in the stem between the first and second ends so that a handlebar device or a handlebar can be passed through the stem between the first and second ends. One or more adjustment members are disposed in the slot which are disposed in the slot according to the desired stem length.

Preferably the adjustment member is removably disposed in the adjustment section. Thus, for example the handlebar device can be adjusted to take a specific stem length by way of an accordingly disposed adjustment member. The adjustment member may preferably be removed from the adjustment section and re-arranged in the adjustment section so that the holding device for the handlebar device is provided in a predetermined position showing a desired stem length.

In convenient specific embodiments at least two adjustment members are disposed in the adjustment section wherein the adjustment members constitute the holding device for the handlebar device. In this configuration the handlebar device is preferably disposed between two adjustment members and fixed in the adjustment section together with the adjustment members.

In advantageous configurations at least two at least substantially similar adjustment members are provided. Similar is in particular understood to mean identical. If more than two adjustment members are provided, it is in particular preferred for all the adjustment members to be similar respectively identical. Thus, depending on the desired stem length, different arrangements of the adjustment members in the adjustment section allow for ease, quickness, and flexibility of setting the desired stem length without requiring attention to a specific arrangement of each of the adjustment members.

It is preferred to arrange at least two adjustment members in the adjustment section substantially mirror-symmetrically. It is thus in particular achieved that one or more adjustment members can be arranged in the adjustment section, and one or more adjustment members are provided mirror-symmetrically in the adjustment section. Then the holding device for a handlebar device can be easily provided between the adjacent adjustment members in the one and the other orientation.

Particularly preferably the adjustment members are configured to be connected. It is e.g. in particular preferred for the single adjustment members to be clamped, pushed, clipped, screwed, and/or clicked together so that the single adjustment members can for example be pre-mounted outside the adjustment section. Then they only require placement in the adjustment section to secure the handlebar device in a specific orientation of the stem length. It is in particular preferred to provide a specific configuration for example tongue and groove or plug and socket type for such a connector system so that the adjustment members are secured to one another so that any standards to be observed regarding secure accommodation of the handlebar device are complied with. Thus for example a configuration approximating the principle of pieces of Lego® can be used advantageously.

Preferably at least one adjustment member can be connected with the adjustment section at least in portions. To this end in particular the adjustment section is configured such that the members provided for interconnecting the single adjustment members can also be used for connecting the single adjustment members respectively at least one adjustment member with the adjustment section. Then the shape of the adjustment section is in particular configured such that the adjustment members respectively facing the first end and the second end can be pushed, inserted, or clicked into the adjustment section at least in portions.

In advantageous configurations the adjustment section comprises at least one guiding device for at least one adjustment member. Then in particular at least one adjustment member shows a configuration so as to be securely retained in the guiding device. Such a guiding device can preferably be provided as a groove in the adjustment section for correspondingly configured appendices at the adjustment members to engage therein in useful configurations so that the adjustment member respectively the adjustment members are securely retained or guided in the adjustment section. The configuration of a rail can also be used advantageously. Generally speaking, a guide for the adjustment members is provided on the top and bottom and/or on the sides, depending on how the adjustment members are retained in the adjustment section.

In convenient specific embodiments at least two rows of adjustment members are disposed in the adjustment section. Then these two rows of adjustment members are in particular configured substantially parallel. Providing two rows of adjustment members preferably allows comparatively narrow adjustment members without limiting the required stability or sufficient fixation of the handlebar device at a specific stem length. The spaced apart rows of adjustment members in particular prevents twisting.

At least one free space is preferably provided between at least two rows of adjustment members. This free space is in particular provided for a mounting space through which one or more lines can be guided from the frame to the handlebar or the handlebar device. For example cables and/or wires and/or lines can be laid through such a free space or mounting space wherein installing the lines within the stem ensures a particularly neat design and moreover a very aerodynamic architecture. These lines or wires or cables allow to provide a mechanical, hydraulic and/or electronic or electric connection between the handlebar device or the stem and/or a component or components attached to the handlebar device and/or the stem for example at the frame of the two-wheeled vehicle.

The free space can preferably also receive other technical devices or single components of these devices. Thus for example tools, electrical joints, hydraulic joints, mechanical joints, batteries, accumulators, and in general, battery chargers for electric devices or other components may be accommodated. Conveniently a kind of pigeonhole may be provided in the free space between the two rows of adjustment members within easy reach of the cyclist. Or else a drawer may be provided for example to push in a tool which is required for adjusting the stem length.

In useful configurations the free space may furthermore be provided with some type of installation aid for lines and/or wires and/or cables which is configured such that the cables, lines and/or wires are optimally installed in the free space independently of their length and the adjusted stem length. Preferably a diverter aid may be provided so that in the case of too long lines, cables, and/or wires they are laid for example in loops to be advantageously arranged in the free space.

Preferably at least one adjustment member comprises at least one adapter member and/or is configured as at least one adapter member. According to the invention the adjustment members are in particular shaped so that a mirror-symmetrical arrangement of a pair of adjustment members provides a holding device for a handlebar device. The adjustment members are shaped so that they preferably establish a form-fit and/or force-fit functional connection with the handlebar device. Depending on the configuration of the handlebar device to be installed, different shapes or cross-sections may be provided so as to require differently shaped holding devices. Then preferably at least one adapter member may replace at least one normal adjustment member and/or supplement a normal adjustment member so as to enable a form-fit and/or force-fit fixation of the handlebar or handlebar device.

In advantageous configurations the inventive configuration of the stem allows to adjust a stem length between 10 mm and 250 mm, preferably between 30 mm and 200 mm and particularly preferably between 50 mm and 150 mm. This is achieved by way of suitably arranging the adjustment members in the adjustment section.

In all the configurations the stem respectively the adjustment section comprises at least one main body and at least one removable cap device. Thus the cap device can be advantageously removed for mounting a handlebar device at a specific stem length wherein the adjustment members are then arranged in the adjustment section in the main body so as to provide a holding device for the handlebar device at a predetermined stem length. Then the handlebar can be inserted. When the cap device is mounted, the handlebar device is securely and reliably fixed in the predetermined stem length in suitable configurations. The cap device may in particular be screwed to the adjustment section.

In advantageous specific embodiments the second end is provided with at least one preferably removable and/or exchangeable stem front cap. Depending on the configuration this stem front cap in particular does not provide a structural component of the stem. In particular in the case of exchangeable or removable stem front caps, stem front caps having different properties and/or functions may be used. Thus, the stem front cap may e.g. contribute to the overall stem design wherein for example a "Formula 1 design" may be chosen. Depending on requirements the stem front cap may comprise lighting systems and/or enable the mounting of lighting systems. Thus, a suitable stem front cap may provide sidewardly and/or forwardly lighting. Or else specific safety aspects may be taken into account. Thus for example a stem front cap of rubber or other soft or flexible materials may be used to reduce injury potential in particular in falls during group rides. The stem front cap may in particular comprise, or provide receptacles for, devices or systems including technical components such as navigation systems, speedometers or telemeters, a smartphone, a computer or a water bottle.

Particularly preferably the stem comprises a receptacle for mounting further handlebar components such as arm rests or bar ends so as to obtain particular flexibility in choosing the riding position for a cyclist.

In all the configurations the stem respectively the main body and/or the cap device and/or the adjustment members preferably comprise recesses and/or they are at least partially or at least in sections configured hollow. Preferably latticed stabilising structures may be provided to ensure sufficient stability of the components. The recesses or partially hollow configuration allow weight reduction for one, and for another provide mounting or installation space for particular flexibility of laying cables, lines, and/or wires.

Preferably the cap plate and/or the second end of the adjustment section comprises at least one electric and/or electronic assembly and/or at least one accommodation for at least one electric and/or electronic assembly. Thus, for example the second end of the stem may provide an incorporated lighting system and/or an accommodation for a lighting system. The cap plate may for example be provided as an accommodation or bracket for a navigation device, a mobile telephone or speedometer or other electronic devices. Depending on the configuration for example a navigation device and/or a GPS module may be integrated in the cap plate.

The stem per se is preferably made of a fibrous composite material, plastic, aluminium and/or other suitable materials. The adjustment members are in particular made of a fibrous composite material, plastic, aluminium and/or other suitable materials.

Useful specific embodiments may provide, other than adjustment members, further distance components to ensure secure accommodation of the handlebar and/or the fork column, independent of their diameters.

BRIEF DESCRIPTION OF THE DRAWINGS

Further advantages and features of the present invention can be taken from the exemplary embodiment which will be described below with reference to the enclosed figures.

The figures show in:

FIG. 6 another exemplary embodiment of an inventive stem without a handlebar device in a perspective view and a side view;

FIG. 7 a perspective top view and a perspective view of the bottom of the stem according to FIG. 6 wherein no adjustment members are inserted;

DETAILED DESCRIPTION

Figure 1:
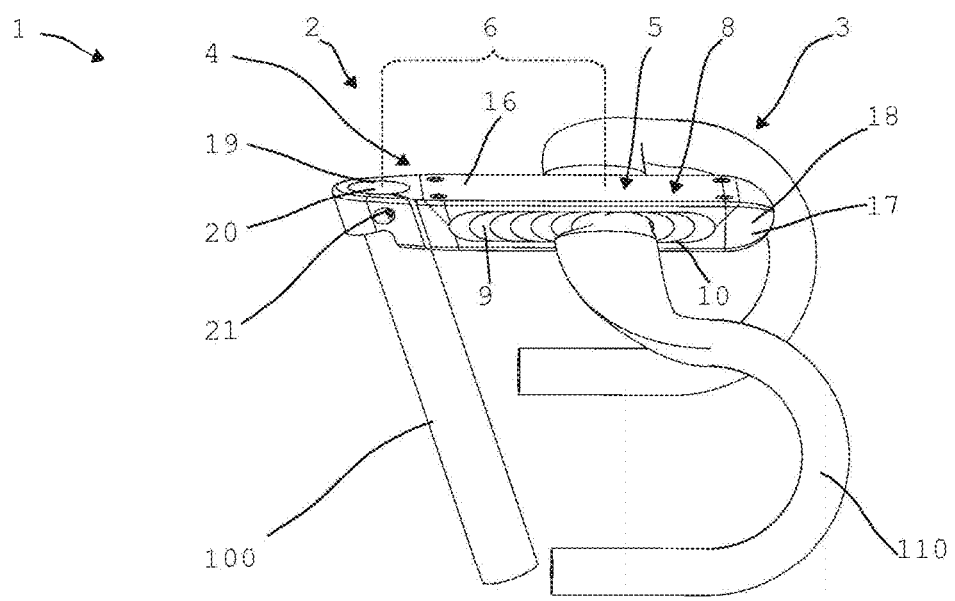
FIG. 1 a purely schematic illustration of a stem according to the invention with a handlebar device installed at a fork column in a perspective side view.

FIG. 1 shows purely schematically a stem 1 according to the invention in a purely schematic view from the side. The stem 1 comprises in the exemplary embodiment shown a first end 2 at which a mounting section 4 is provided. This mounting section 4 allows to accommodate the stem 1 on a fork column 100 of a bicycle not shown in detail.

The mounting section 4 comprises a through hole 19 provided by a kind of clamp 20 which in the exemplary embodiment shown is attached to the remainder of the stem 1 by means of screws 21. The stem 1 can thus be readily placed on the fork column 100 and then fixed by means of the screws 21.

A holding device 5 for a handlebar device 110 is provided between the first end 2 and the second end 3 of the stem 1 wherein the holding device 5 provides for a firm and stable accommodation of the handlebar device 110 in the stem 1.

A stem length 6 is adjusted between the centre of the through hole 19 of the mounting section 4 and the centre of the holding device 5 for the handlebar device 110 so that a cyclist can grasp the handlebar in a specific riding position. According to the invention the stem length 6 can be adjusted as desired depending on the cyclist's size or his desired riding position.

To this end the holding device 5 for the handlebar device is disposed in an adjustment section 8 in which in the exemplary embodiment shown a number of adjustment members 9 is inserted by means of which the handlebar device 110 is secured in the stem 1 in a specific stem length 6, 7.

Depending on the arrangement of the adjustment members 9 in the adjustment section 8 different stem lengths 6 can be adjusted flexibly, fast, and easily.

As can be seen in the following figures, the stem 1 comprises a main body 31 and a removable cap device 16. The cap device 16 is in particular provided so that removing the cap device 16 releases at least the adjustment section 8 at least partially. When the cap device 16 is removed, the adjustment members 9 and the handlebar device 110 can be taken out of the adjustment section 8 or arranged as required.

According to the invention the cap device 16 may comprise an electric and/or electronic assembly or provide an accommodation 18 for such an assembly 17, not shown in detail in the figures. Thus, the cap device 16 may comprise for example a navigation system, a mobile telephone, a speedometer or the like electric instruments or provide a holder for these electronic devices.

The second end 3 may also be provided with an accommodation 18 for an electric and/or electronic assembly 17. In other preferred and not shown configurations the second end 3 may also comprise an electronic or electric assembly and/or may be configured as such an assembly. In particular the second end 3 of the stem 1 may comprise a lighting system so that no additional components need to be disposed at the stem 1 respectively the handlebar device 110 which would deteriorate the aerodynamic flow resistance of the stem 1 respectively of the entire handlebar assembly.

Figure 2:
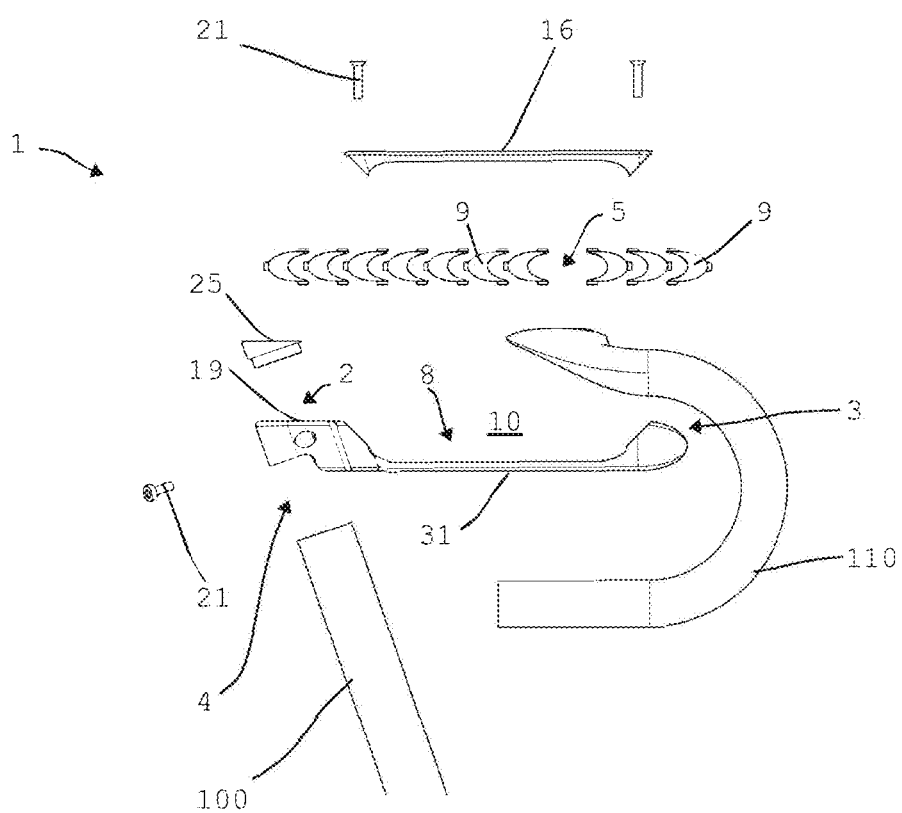
FIG. 2 the view according to FIG. 1 in a purely schematic exploded view.

FIG. 2 illustrates purely schematically a side view of the stem 1 shown in FIG. 1 in a purely schematic exploded view. Other than the stem 1, the fork column 100 and the handlebar device 110 are illustrated as in FIG. 1.

In this view it can be seen that with the cap device 16 removed the adjustment members 9 and the handlebar device 110 can be removed from the adjustment section 8.

In the exemplary embodiment shown the single adjustment members 9 are configured similarly or identically wherein, depending on the desired stem length, some of the adjustment members 9 are present in the same orientation and other adjustment members 9 are disposed mirror-symmetrically in the adjustment section 8. In this configuration the holding device 5 for the handlebar device 110 is formed between or through two adjustment members 9 disposed mirror-symmetrically. Depending on the arrangement of the adjustment members 9 in the adjustment section 8, different stem lengths 6, 7 can thus be set easily and flexibly.

It is furthermore shown that a cap 25 is assigned to the mounting section 4 which cap, after mounting the stem 1 onto the fork column 100, is put onto the through hole 19 for closing the same.

For ensuring a particular stable accommodation of the handlebar device 110 in the adjustment section 8 the adjustment members are configured such that they can be connected with one another and in the exemplary embodiment shown, snapped onto one another. Thus, some adjustment members 9 may be premounted by being snapped onto one another to then insert these together into the installation section 8.

Figure 3:
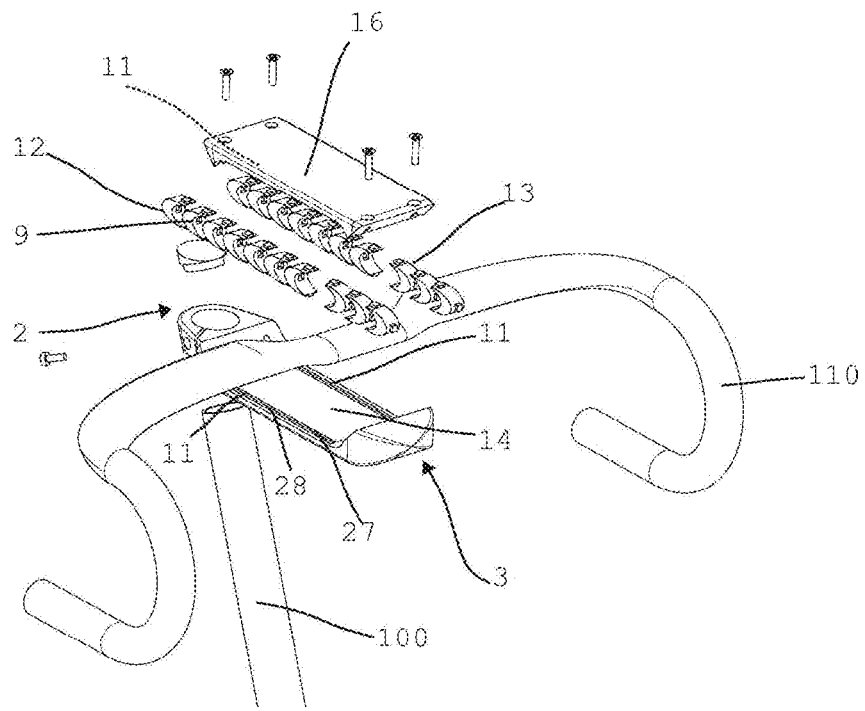
FIG. 3 the stem according to FIG. 1 in a purely schematic, perspective exploded view.

FIG. 3 illustrates the stem 1 according to the FIGS. 1 and 2 in a purely schematic, perspective exploded view, in an oblique front view. In this view it can be seen that two rows 12, 13 of adjustment members 9 are disposed in the adjustment section 8.

In this way it is possible among other things for the single adjustment members to be configured comparatively narrow while still ensuring a very stable, form-fit and/or force-fit accommodation of the handlebar device 110 in the adjustment section 8. With such a configuration it is in particular possible to observe any existing standards regarding the non-rotatability respectively the stable accommodation in the handlebar device 110 in the stem 1.

A free space 14 remains between the two rows 12, 13 of the adjustment members 9 which in the exemplary embodiment shown can be used as a mounting space. This free space 14 between the two rows 12, 13 allows for example the laying of concealed electric lines, wires such as Bowden cables, hydraulic lines or other lines, so as to not needlessly impede the aerodynamics of the stem or the entire handlebar installation.

In FIG. 3 one can furthermore see that guiding devices 11 are provided in the adjustment section 8 which in the exemplary embodiment shown are provided by way of milling 26 or as a duct 27 inside the base plate 28 of the stem 1.

Corresponding guiding devices 11 are also provided in the exemplary embodiment shown in the cap device 16.

As can be clearly seen in the following figures, the adjustment members 9 in the exemplary embodiment shown comprise appendices 22 engaging in the guiding devices 11. In this way a particularly stable and secure accommodation of the handlebar device 110 can be ensured in the adjustment section 8.

Figure 4:
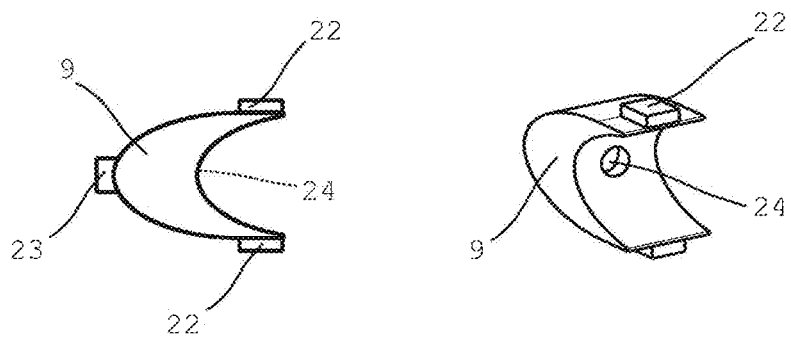
FIG. 4 a purely schematic illustration of an adjustment member in a side view and a perspective view.

FIG. 4 illustrates purely schematically an adjustment member 9 in a side view and in a perspective view.

In these illustrations one can clearly recognize the appendices 22 engaging in the guiding device 11 of the adjustment section 8. Furthermore the adjustment members 9 comprise an appendix 23 which can engage in an opening 24 of an adjacent adjustment member 9.

The adjustment members 9 moreover comprise a shaping 29 which contributes to stability when pushing the single adjustment members 9 into one another and which is moreover adapted to the cross-section of the handlebar device 110. Thus, the shaping 29 of two adjustment members 9 allows to provide a holding device 5 for the handlebar device 110.

To enable the stem 1 to receive different handlebar devices 110, an adapter member 15 may be provided depending on the configuration which replaces an adjustment member 9 or supplements it so as to ensure a form-fit and/or force-fit accommodation of the handlebar device 110 in the holding device 5 respectively the adjustment section 8.

Figure 5:
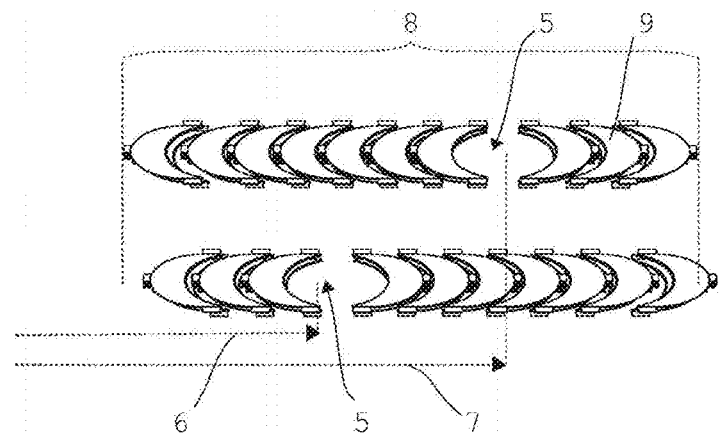
FIG. 5 a purely schematic illustration of the adjustment of different stem lengths by means of multiple adjustment members.
Figure 8:
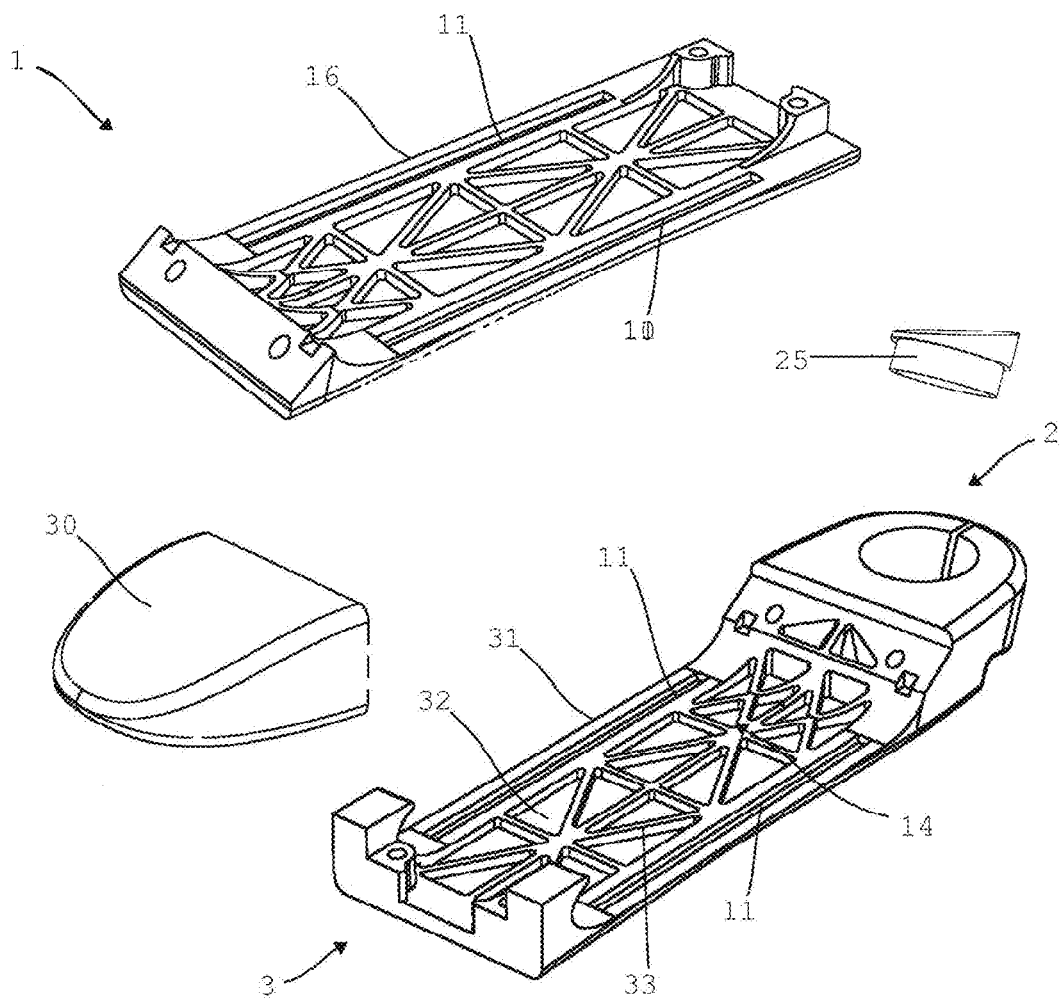
FIG. 8 a dismantled illustration of the stem according to FIG. 7.
Figure 9:
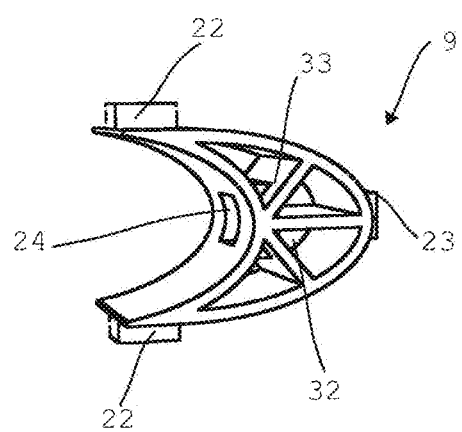
FIG. 9 a perspective view of an adjustment member for a stem according to the invention.

FIG. 5 illustrates purely schematically how different arrangements of the single adjustment members 9 in the adjustment section 8 allow the setting of different stem lengths 6, 7.

To this end the cap device 16 is removed and depending on the desired stem length 6, 7 the single adjustment members 9 are pushed together so as to arrange the holding device 5 in a suitable position between the first end 2 and the second end 3 of the stem 1 in the adjustment section 8.

The exemplary embodiment shown allows adjusting stem lengths between 50 mm and 150 mm. This is achieved by correspondingly arranging the single adjustment members 9 in the adjustment section 8.

In this way a secure and reliable accommodation of the handlebar device 110 in different stem lengths 6, 7 can be quickly and flexibly achieved.

The FIGS. 6 to 9 illustrate purely schematically another exemplary embodiment of a stem 1 according to the invention. The architecture of the shown stem 1 substantially corresponds to the architecture of the stem 1 as it is illustrated in the FIGS. 1 to 5.

Unlike the exemplary embodiment described above, the stem 1 according to the FIGS. 6 to 9 comprises, other than a main body 31 and a cap device 16, a removable or exchangeable stem front cap 30.

This stem front cap 30 is attached to the second end 3 of the stem and thus faces forwardly in the traveling direction. The stem front cap 30 is for example screwed and/or pushed and/or clamped to the second end 3 so that the stem is preferably exchangeable.

Thus, a cyclist can select a suitable stem front cap 30 as needed. For example the stem front cap 30 for group rides may be made of a soft or flexible material such as rubber to reduce the risk of injury in the case of falls in particular for the other cyclists.

Or else the stem front cap 30 may comprise technical components or holders respectively receptacles for these components. Thus for example navigation systems, smartphones, speedometers and/or distance measuring equipment or water bottles may be, or can be, disposed at the stem front cap.

This exemplary embodiment furthermore shows exemplarily that the stem 1, in particular the main body 31, the cap device 16 and/or the adjustment members 9, may comprise recesses 32 or hollow spaces 32. This allows for one reducing the weight, and for another providing suitable mounting or laying spaces.

In particular the adjustment members 9 allow to receive cables, lines or wires to be laid passing through the hollow spaces 32 in the adjustment member 9.

To ensure sufficient stability, the shown exemplary embodiment provides for lattice structures 33 which achieve the required stability of the components although material is reduced.

The features and configurations of the two exemplary embodiments are purely exemplary and they may certainly be combined with one another and also extended.

| List of reference numerals: | |
| --- | --- |
| 1 | stem |
| 2 | first end |
| 3 | second end |
| 4 | mounting section |
| 5 | holding device |
| 6 | stem length |
| 7 | stem length |
| 8 | adjustment section |
| 9 | adjustment member |
| 10 | slot device |
| 11 | guiding device |
| 12 | row |
| 13 | row |
| 14 | free space |
| 15 | adapter member |
| 16 | cap device |
| 17 | assembly |
| 18 | accommodation |
| 19 | through hole |
| 20 | clamp |
| 21 | screws |
| 22 | appendix |
| 23 | appendix |
| 24 | opening |
| 25 | cap |
| 26 | milling |
| 27 | duct |
| 28 | base plate |
| 29 | shaping |
| 30 | stem front cap |
| 31 | main body |
| 32 | recess |
| 33 | lattice structure |
| 100 | fork column |
| 110 | handlebar device |

The invention claimed is:

1. A stem for an at least partially muscle-powered two-wheeled vehicle comprising:
   at least one first end and at least one second end, wherein the first end is provided with at least one mounting section configured to be fastened to at least one fork column;
   at least one holding device for at least one handlebar device, said at least one holding device being disposed between the first end and the second end, wherein a stem length is set between said at least one mounting section and said at least one holding device;
   at least one adjustment section provided between the first end and the second end, wherein at least two rows of adjustment members are arranged in said at least one adjustment section,
   wherein said at least one holding device for the handlebar device is provided by means of the adjustment member at least in portions, and wherein at least two different stem lengths can be set depending on the arrangement of the adjustment member in the adjustment section.

2. The stem according to claim 1, wherein the at least one adjustment section comprises at least one slot device.

3. The stem according to claim 1, wherein the at least one of said adjustment members is removably disposed in the at least one adjustment section.

4. The stem according to claim 1, wherein the at least one holding device for the handlebar device is formed by the two of said adjustment members.

5. The stem according to claim 4, wherein said two adjustment members are arranged to substantially mirror-symmetrically.

6. The stem according to claim 4, wherein said two adjustment members are configured to be connected.

7. The stem according to claim 1, wherein one of said adjustment members is connected with said at least one adjustment section at least in portions.

8. The stem according to claim 1, said at least one adjustment section comprises at least one guiding device for said adjustment members.

9. The stem according to claim 1, further comprising at least one free space provided between the first end and the second end.

10. The stem according to claim 1, wherein said stem length is between 10 mm and 250 mm.

11. The stem according to claim 1, wherein said at least one adjustment section comprises at least one removable cap device.

12. The stem according to claim 1, wherein said at least one adjustment section comprises at least one removable stem front cap.

* * * * *